United States Patent
Dupuis et al.

(10) Patent No.: US 7,243,986 B2
(45) Date of Patent: Jul. 17, 2007

(54) SPOT-WELDED JOINT FOR HYDROFORMED MEMBERS

(75) Inventors: Larry Dupuis, Grosse Ile, MI (US); Dragan Stojkovic, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 10/967,926

(22) Filed: Oct. 19, 2004

(65) Prior Publication Data

US 2006/0082123 A1 Apr. 20, 2006

(51) Int. Cl.
*B62D 25/08* (2006.01)
(52) U.S. Cl. .................................. 296/205
(58) Field of Classification Search ........... 296/205, 296/187.01, 193.01, 193.07, 193.09, 203.01, 296/204, 203.02, 29, 30
See application file for complete search history.

(56) References Cited

U.S. PATENT DOCUMENTS

| | | | |
|---|---|---|---|
| 6,299,237 B1 * | 10/2001 | Benz et al. | 296/187.09 |
| 6,361,102 B1 * | 3/2002 | Han | 296/203.02 |
| 6,416,117 B1 * | 7/2002 | Weiman | 296/204 |
| 6,715,573 B2 * | 4/2004 | Emori et al. | 180/68.4 |
| 6,729,424 B2 * | 5/2004 | Joutaki et al. | 180/68.4 |
| 7,036,874 B2 * | 5/2006 | Stojkovic et al. | 296/193.09 |
| 7,066,533 B2 * | 6/2006 | Sohmshetty et al. | 296/203.02 |
| 2002/0043814 A1 * | 4/2002 | Weiman | 296/29 |
| 2003/0025358 A1 * | 2/2003 | Taguchi et al. | 296/203.02 |
| 2003/0141745 A1 * | 7/2003 | Henderson et al. | 296/203.02 |
| 2005/0012362 A1 * | 1/2005 | Patberg et al. | 296/203.01 |
| 2005/0236827 A1 * | 10/2005 | Mouch et al. | 280/788 |
| 2005/0264042 A1 * | 12/2005 | Abe et al. | 296/203.01 |
| 2005/0269838 A1 * | 12/2005 | Sohmshetty et al. | 296/203.02 |

* cited by examiner

*Primary Examiner*—H Gutman
(74) *Attorney, Agent, or Firm*—Gigette Bejin; Miller Law Group, PLLC

(57) ABSTRACT

A process for spot-welding hydroformed members allows at least one hydroformed member to be positioned with an end butted against a lateral side of the second hydroformed member. A structural shell member sandwiches the joint around the two hydroformed members to provide a surface to which each of the hydroformed members can be spot-welded. The U-shaped structural support receives the lateral side of one hydroformed member in the bight portion thereof and has arms that are positioned against the perpendicularly positioned second hydroformed member. Each of the hydroformed members are formed with access openings therein to allow spot-welding electrodes to be positioned against an appropriate wall of the hydroformed member and the adjacent portion of the U-shaped structural shell member. The joint is rigidly formed by spot-welding each of the hydroformed members to the structural support. The process is particularly adapted for utilization in the manufacture of automotive frames.

12 Claims, 5 Drawing Sheets

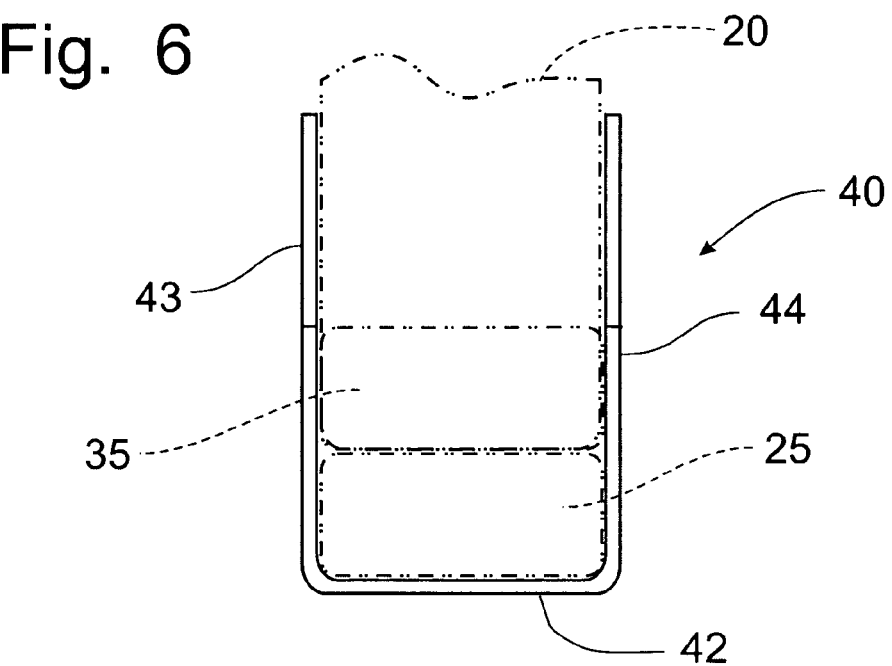
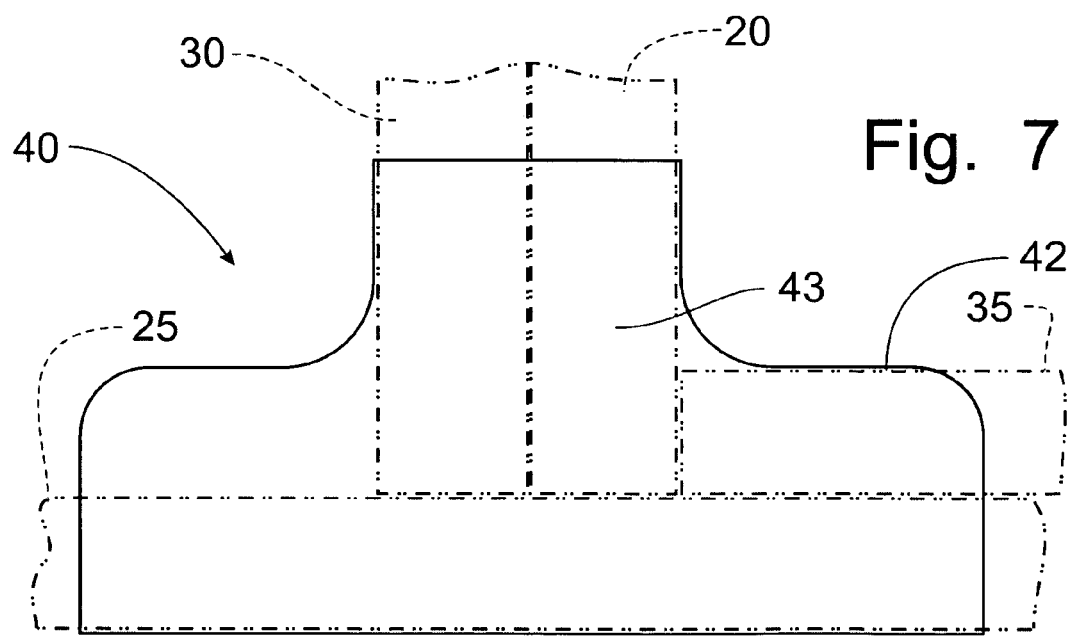

SPOT-WELDED JOINT FOR HYDROFORMED MEMBERS

BACKGROUND OF THE INVENTION

Manufacturing processes for automobiles have evolved from one that utilized MIG welding processes, i.e. a welding process in which a line of molten material is deposited by the welder in joining two pieces of metal together. Spot-welding, a process involving the passage of electrical current between two electrodes to melt and join two pieces of metal placed between the electrodes, is being utilized in a greater degree in the manufacturing of automotive vehicles. Spot-welding requires a frame design that is conducive to being manufactured using the spot-welding process. For example, if two tubular members are being spot-welded, access to the adjoining walls of the two tubular members by the spot-welder electrodes must be provided.

The joinder of hydroformed frame members presents a problem for frame construction in automobiles. If the frame members are positioned in a parallel orientation, the contiguous sides of the two frame members can be spot-welded together with the electrodes being inserted through openings formed during the hydroforming process in the respective opposing sides of the frame members.

Since hydroformed frame members are tubular in configuration, the frame members have open ends. Therefore, welding the connection of a frame member that is butted against a lateral side of another frame member presents a welding problem that is conventionally solved by MIG welding processes with the edges of the butted frame member being welded to the sides of the adjoining frame member. If the frame member being butted against the lateral side of the other frame member is physically smaller that the other frame member, the smaller frame member can be inserted into an opening formed in the other frame member so that the smaller frame member butts or aligns with the opposing surface of the larger frame member and the respective sides of the frame members can be spot-welded together if the frame members are sized appropriately. However, such welding techniques do not work if the two frame members are not sized to snuggly fit together before being spot-welded.

Accordingly, it would be desirable to provide a system and welding process in which spot-welding techniques could be utilized to weld together frame members that are butted together with at least one end of a frame member to be welded to anther frame member.

SUMMARY OF THE INVENTION

It is an object of this invention to overcome the aforementioned disadvantages of the known prior art by providing a process through which automotive frame members can be welded in a T-configuration through the use of spot-welding techniques.

It is another object of this invention to provide a structural member that will facilitate the welding of hydroformed frame members in a T-configuration.

It is a feature of this invention that the hydroformed frame members can be spot-welded into a T-configuration.

It is an advantage of this invention that the MIG welding process is not needed for the manufacturing of the vehicle frame structure.

It is another advantage of this invention that the cost of manufacturing automotive frames can be reduced.

It is another feature of this invention that a U-shaped structural member is used to weld to each respective frame member to form a spot-welded joint.

It is still another advantage of this invention that MIG welding techniques are not required to form a T-shaped frame joint in automobiles.

It is yet another advantage of this invention that the rigidity of a hydroformed frame joint is improved.

It is still another advantage of this invention that the two frame members to be spot-welded together do not have to be properly sized to snuggly fit together.

It is a further feature of this invention that the structural member joining the two frame members can be formed and sized specifically for the frame members being joined together.

It is a further object of this invention to provide structure and a process for utilizing the structure to form a T-shaped joint from hydroformed frame members in an automotive vehicle that is durable in construction, inexpensive of manufacture, carefree of maintenance, facile in assemblage, and simple and effective in use.

These and other objects, features and advantages are accomplished according to the instant invention by providing a process for spot-welding hydroformed members in a T-shaped configuration where at least one hydroformed member has an end butted against a lateral side of the second hydroformed member. A structural shell member sandwiches the joint around the two hydroformed members to provide a surface to which each of the hydroformed members can be spot-welded. The U-shaped structural support receives the lateral side of one hydroformed member in the bight portion thereof and has arms that are positioned against the perpendicularly positioned second hydroformed member. Each of the hydroformed members are formed with access openings therein to allow spot-welding electrodes to be positioned against an appropriate wall of the hydroformed member and the adjacent portion of the U-shaped structural shell member. The joint is rigidly formed by spot-welding each of the hydroformed members to the structural support. The process is particularly adapted for utilization in the manufacture of automotive frames.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is an enlarged transverse elevational view of an alternative embodiment of the U-shaped structural shell member; and FIG. 7 is an enlarged longitudinal elevational view of the U-shaped structural shell member depicted in FIG. 6.

DETAILED DESCRIPTION OF THE PREFERRED EMBODIMENT

Referring to FIGS. 1-5, a joint forming a part of an automobile frame through a process incorporating the principles of the instant invention can best be seen. The automotive frame 10 is preferably formed from as many hydroformed tubular members as possible. Such tubular members can be spot-welded to form an integral frame assembly for the front end of a vehicle.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members.

Spot-welding frame members that are oriented with portions positioned parallel to one another is accomplished by positioning the spot-welding electrodes through the access openings formed in the members to spot-weld adjacent surfaces together, as will be described in greater detail below. Spot-welding frame members that are of substantially equal or greatly disparate sizes and which are placed in a T-shaped configuration, in which the end of one frame member is butted against the lateral side of a second frame member, is more problematic in that such orientation of frame members does not place two surfaces against each other that can be spot-welded.

Figure 1:
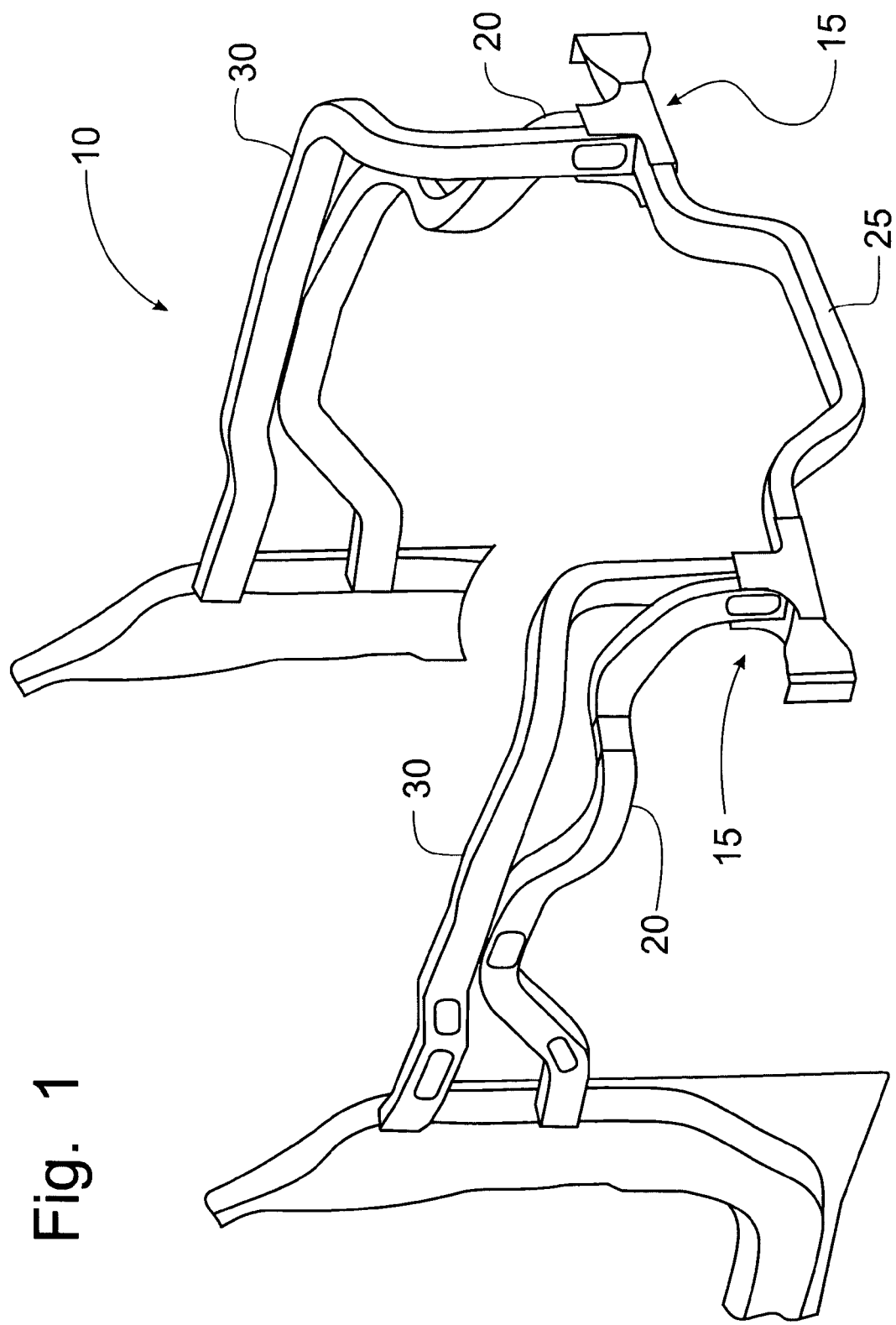
FIG. 1 is a perspective view of a front end portion of an automotive frame incorporating the principles of the instant invention.
Figure 2:
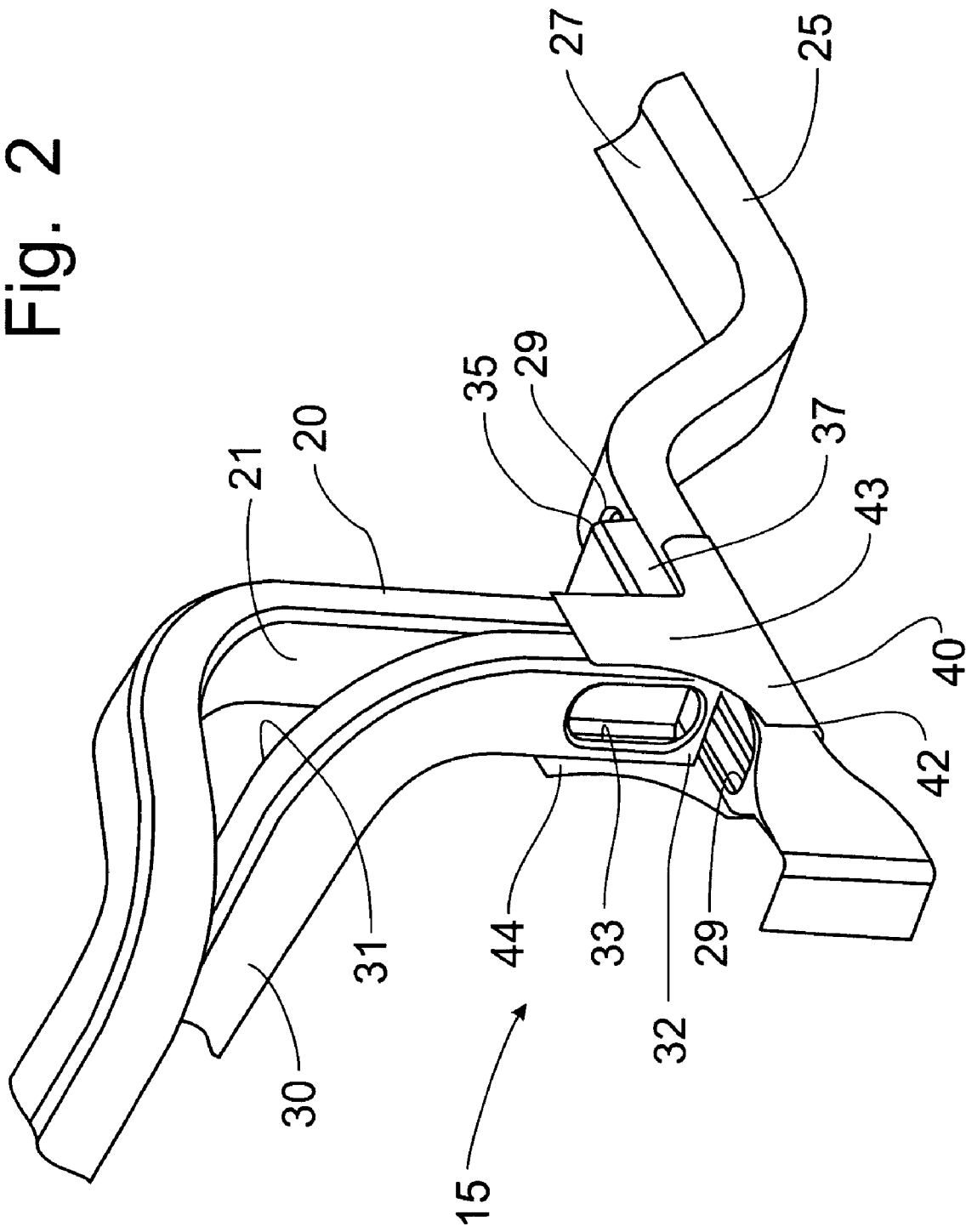
FIG. 2 is an enlarged front perspective view of a joint formed according to the principles of the instant invention.
Figure 3:
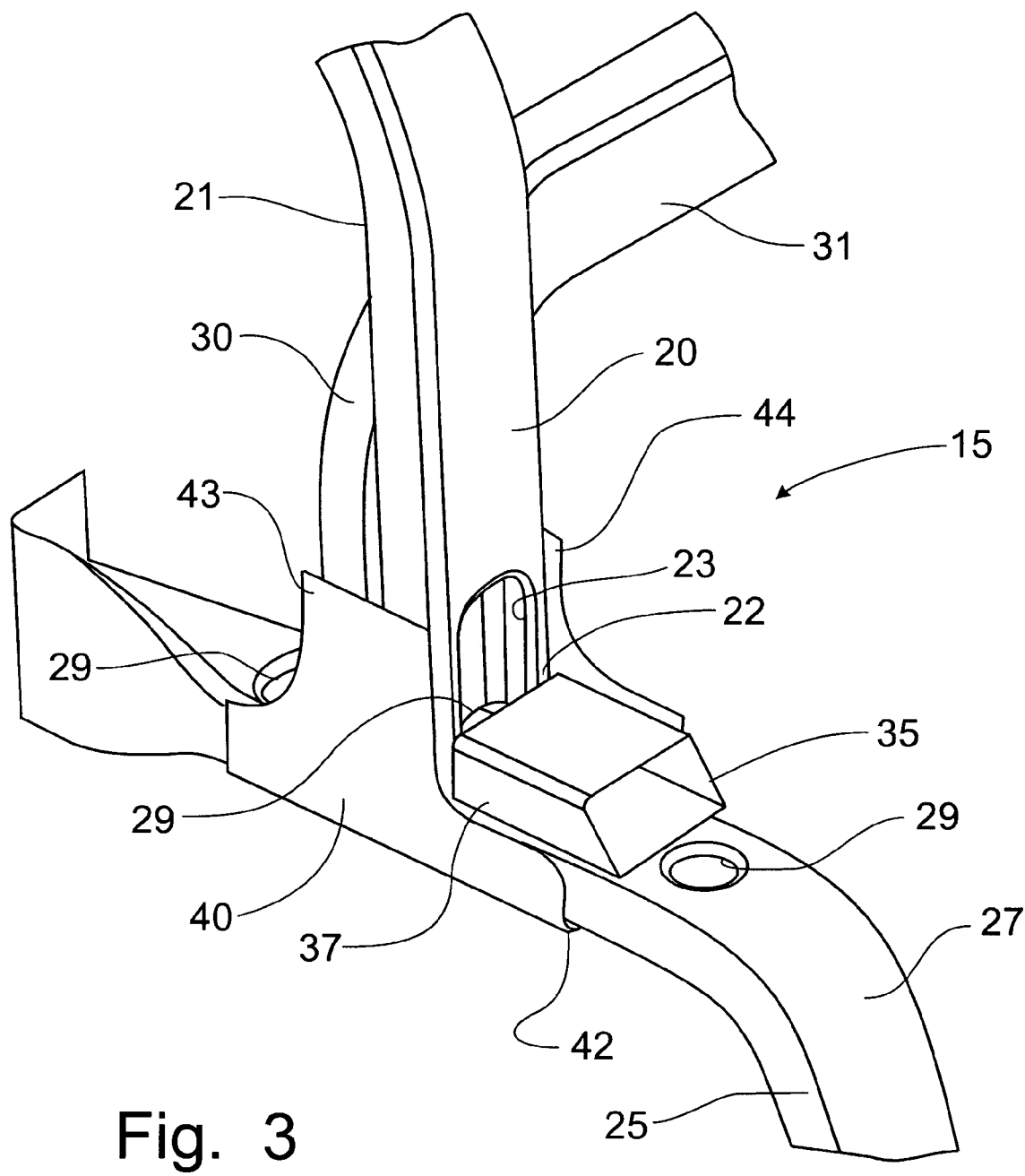
FIG. 3 is an enlarged rear perspective view of the joint depicted in FIG. 2.

As can be seen best in FIGS. 2 and 3, the joint 15 is formed by a first hydroformed frame member 20 with the end 22 thereof placed against the lateral side 27 of a second hydroformed frame member 25 in a perpendicular relationship therewith. As shown in FIGS. 2 and 3, a third frame member 30 can be positioned adjacent the first frame member 20 with the end 32 thereof in perpendicular orientation to the lateral side 27 of the second frame member 25 and positioned next to the end 22 of the first frame member 20.

The ends 22, 32 of the first and third frame members 20, 30 are formed with access openings 23, 33 on the walls 24, 34 facing away from the other frame member 20, 30. These access openings 23, 33 enable the electrodes of the spot-welder to be positioned in opposition to the adjacent sides 21, 31 of the first and third frame members 20, 30. In this manner, the first and third hydroformed frame members 20, 30 and be spot-welded together.

Figure 4:
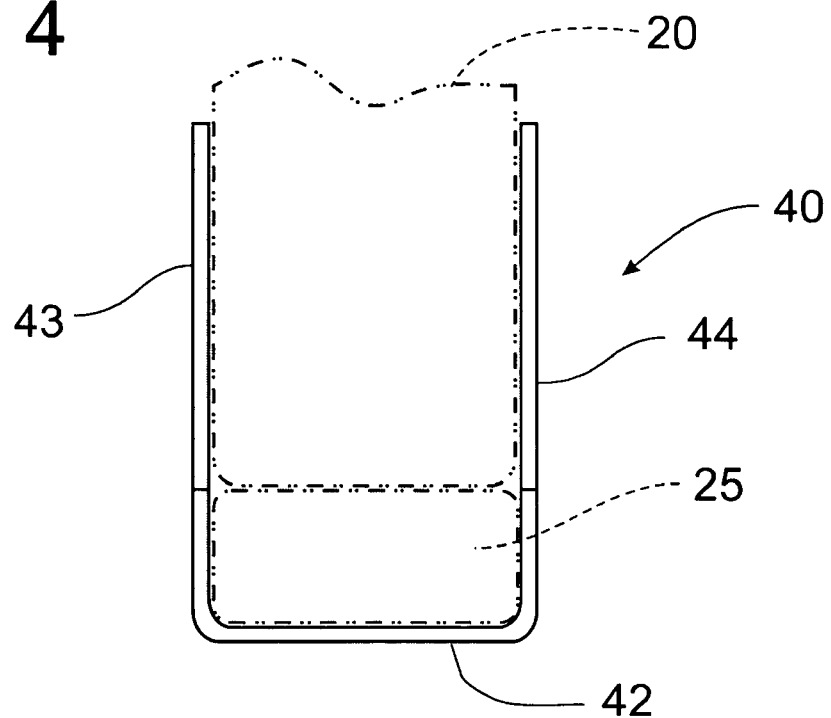
FIG. 4 is an enlarged transverse elevational view of the U-shaped structural shell member utilized to form the spot-welded joint depicted in FIGS. 2 and 3.
Figure 5:
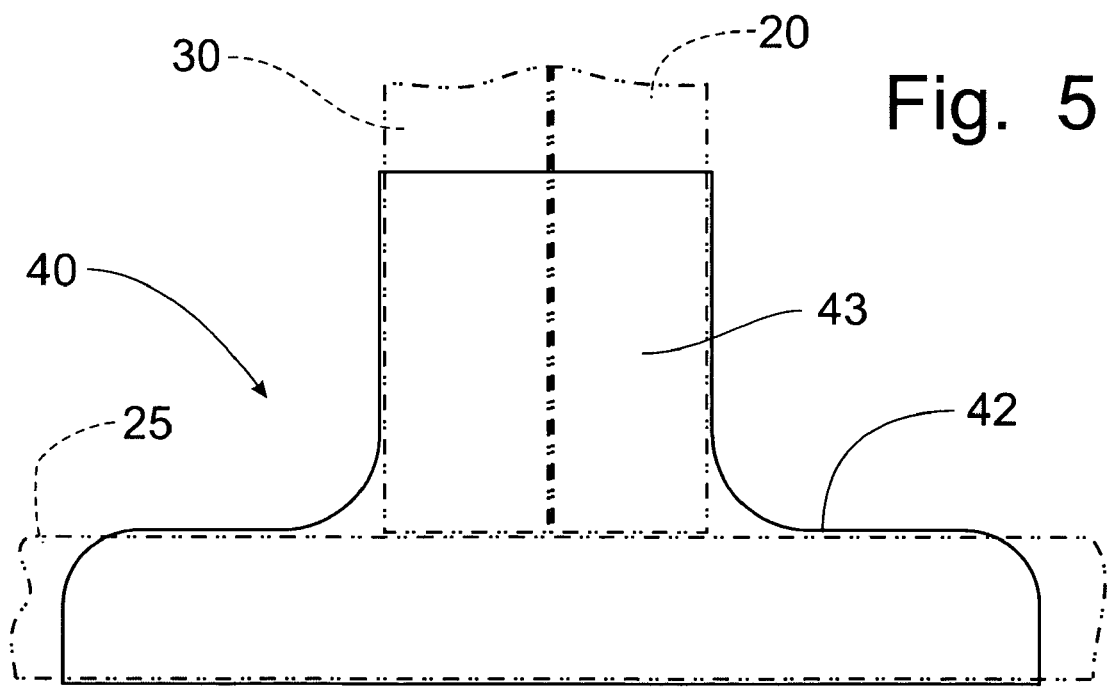
FIG. 5 is an enlarged longitudinal elevational view of the U-shaped structural shell member depicted in FIG. 4.

To form the joint 15, a U-shaped structural shell member 40 is fitted onto the second frame member 25 such that the lateral sides 27 of the second frame member 25 are received within and oriented parallel to the bight portion 42 of the member 40. As best seen in FIGS. 4 and 5, the U-shaped shell member 40 is formed with a longitudinally extending, elongated bight portion 42 and a pair of opposing upright leg portions 43, 44 centrally positioned with respect to the elongated bight portion 42. The leg portions 43, 44 are sized and shaped to correspond to the configuration of the first and/or third frame members 20, 30 that are to be attached to the second frame member 25 to form the joint 15.

In the embodiment depicted in FIGS. 2 and 3, the width of the first and third frame members 20, 30 are substantially the same size as the second frame member 25; thus, the U-shaped structural shell member 40 is uniform with the central leg portions 43, 44 being generally planar and parallel. As reflected in FIGS. 6 and 7, the first and/or third frame members 20, 30 could be smaller in width than the second frame member 25. In this configuration, the U-shaped structural shell member 40 would have the leg portions 43, 44 bent inwardly with respect to the bight portion 42 to snuggly receive the frame members 20, 30 and permit spot-welding as described in greater detail below. One skilled in the art will recognize that other similar configurations of the U-shaped shell member 40 would be utilized with configurations in which the first and third frame members 20, 30 are differently sized.

Openings 29 are formed in the top surface of the second frame member 25 to permit the positioning of an electrode of a spot-welder to be inserted into the body of the second hydroformed frame member 25 to be adjacent the lower surface thereof. With the opposing electrode of the spot-welder being positioned on the outside of the bight portion 42 of the U-shaped member 40, the second frame member 25 can be spot-welded to the shell member 40. The electrodes can also be positioned such that one electrode is inserted through the opening 23 to be located internally of the first frame member 20 with the opposing electrode on the outside of the adjacent part of the leg portion 43 to spot-weld the first frame member 20 to the shell member 40. A re-positioning of the spot-welder electrodes will similarly weld the opposite side of the first frame member to the opposing leg portion 44. If a third frame member is to be added to the joint 15, the spot-welder is positioned to effect a spot-weld between the third frame member 30 and the opposing leg portions 43, 44.

In the configuration with three frame members 20, 25, 30 as depicted in FIGS. 2 and 3, the joint 15 is rigidly formed with spot-welds connecting the adjacent sides of the first and third frame members 20, 30, each of the first and third frame members 20, 30 to the opposing leg portions 43, 44 of the shell member 40, and the adjacent sides of the second frame member 25 to the bight portion 42 of the shell member 40. Such a joint construction provides a rigid and economically manufactured frame joint 15.

As depicted in FIG. 3, a fourth frame member 35 (as well as additional similar frame members) may be accommodated and optionally added to the joint 15 in a parallel orientation to the second frame member 25. In such a configuration, the bight portion 42 will be configured to extend upwardly parallel to the leg portions 43, 44 sufficiently to overlap the side wall 37 of the fourth frame member 35. An appropriate opening can be positioned to permit the introduction of an electrode internally of the fourth frame member 35 and, with the opposing electrode positioned outside of the extended part of the bight portion 42, the fourth frame member can also be spot-welded to the U-shaped structural shell member 40 and added to the joint 15.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive frame in which first and second frame members are to be welded into a T-shaped configuration with an end of said first frame member positioned against a lateral side of said second frame member, the improvement comprising:
   a U-shaped structural shell member having a bight portion receiving said second frame member and perpendicularly extending, parallel opposing leg portions positioned to snuggly receive the first frame member, said second frame member being spot-welded to said bight portion and said first frame member being spot-welded to said opposing leg portions to form a joint in said automotive frame.

2. The automotive frame of claim 1 wherein said first and second frame members have access openings formed therein for permitting access for welding internally of the respective said frame member.

3. The automotive frame of claim 2 wherein said leg portions are sized to cooperate with a third frame member having an end positioned perpendicularly to said second frame member adjacent to said first frame member.

4. The automotive frame of claim 3 wherein said first and third frame members are spot-welded to one another, said third frame member having an access opening to permit welding internally of said third frame member.

5. The automotive frame of claim 4 wherein said leg portions of said U-shaped shell member are planar and extend perpendicularly to said bight portion.

6. The automotive frame of claim 4 wherein said bight portion includes extended portions oriented generally parallel to said leg portions to permit spot-welding of a fourth frame member oriented generally parallel to said second frame member to said extended portions of said U-shaped member.

7. An automotive frame joint comprising:
   a first hydroformed frame member having an access opening formed near an end thereof;
   a second hydroformed frame member having an access opening formed in a first lateral side thereof, said second frame member having an opposing lateral side oriented generally parallel to said first lateral side; and
   a U-shaped structural shell member having a bight portion and a pair of generally perpendicularly extending leg portions, said bight portion being sized to snuggly receive said second frame member with said second lateral side being spot-welded to said bight portion, said leg portions being spaced apart a distance substantially equal to a width dimension of said first frame member to snuggly receive said first frame member therebetween, said first frame member being spot-welded to said opposing leg portions.

8. The automotive frame joint of claim 7 further comprising:
   a third hydroformed frame member having an access opening formed adjacent an end thereof, said third frame member being positioned with a side thereof being positioned against a corresponding side of said first frame member, said first and third frame members being spot-welded together through the corresponding sides thereof.

9. The automotive frame joint of claim 7 wherein said first frame member has a width dimension substantially equal to a corresponding width dimension of said second frame member, said leg portions extending generally planar and perpendicular to said bight portion.

10. The automotive frame joint of claim 8 wherein said first and third frame members have a width dimension substantially equal to a corresponding width dimension of said second frame member, said leg portions of said U-shaped shell member being planar and extending perpendicularly to said bight portion.

11. The automotive frame joint of claim 7 wherein each said leg portion has a portion bent inwardly toward the opposing said leg portion to accommodate said first frame member having a width dimension smaller than a corresponding width dimension of said second frame member.

12. The automotive frame joint of claim 8 wherein said bight portion includes extended portions oriented generally parallel to said leg portions to permit spot-welding of a fourth frame member oriented generally parallel to said second frame member to said extended portions of said U-shaped member.

* * * * *